Feb. 18, 1964 R. JACOBI 3,121,773

TELEVISION APPARATUS WITH SAFETY PANE

Filed March 24, 1961

Inventor:

Richard Jacobi

United States Patent Office 3,121,773

Patented Feb. 18, 1964

3,121,773

TELEVISION APPARATUS WITH SAFETY PANE

Richard Jacobi, Unterkoblitz, Post Wernberg, Oberpfalz, Germany, assignor to Deutsche Tafelglas Aktiengesellschaft Detag, Furth, Bavaria, Germany, a German corporation Filed Mar. 24, 1961, Ser. No. 98,180
Claims priority, application Germany Mar. 31, 1960
7 Claims. (Cl. 178—7.82)

The invention relates to television apparatus provided with a protective pane of safety glass placed on the viewer's side of the television tube for protection against injuries resulting from an implosion of the tube.

In the manufacture of television apparatus ever increasing attention has been and still is paid to reducing the depth of the set, i.e. its horizontal overall width normal to the screen, and it is for this reason that the industry is now using television tubes with smaller screen curvatures.

For a still further reduction of depth it is already known to curve the protective pane spherically in conformity with the tube screen, so that the depth of the apparatus is reduced at the edge portions of the housing of the apparatus by an amount corresponding to the rise of pane curvature.

It is well known that for preventing eye strain and headaches caused by image flicker to the viewers of television programs, the program should not be viewed in a darkened room but with the room lighting turned on. For television apparatus equipped with the hitherto customary planar panes the room lighting does not adversely affect the viewing, because the light emanating from the room lighting mostly comes from above and is reflected downwardly by the substantially vertically disposed protective pane. When spherically curved protective panes are used, a substantial drawback does, however, result from the fact that not only the reflections of the aforementioned room light are more pronounced but there also appear on the protective pane more reflections of bright objects; such as windows and mirror-like reflecting panes of cupboards etc. which due to their brightness caused by their reduction in size on the spherically curved pane adversely affect the images reproduced on the television screen.

The object of the invention is the provision of a protective pane which on the one hand does not substantially increase the aforesaid depth of the television apparatus and on the other hand substantially eliminates annoying reflection of light onto the screen of the television tube.

In accordance with the invention these objects are attained by using a protective pane the upper portion of which, particularly the portion disposed above the horizontal center plane of the tube is of planar configuration and arranged substantially vertical, the lower portion of the pane being bent in a direction towards the lower edge of the television tube.

Preferably the arrangement is such that the lower portion is curved substantially cylindrically so as to subtantially conform to the radius of curvature which the television screen has at its intersection with a vertical center plane disposed normal to said screen.

In protective panes having a configuration in accordance with the invention reflections caused by light within the room in which the television apparatus is disposed, are deflected downwardly in the manner known from planar protective panes and thus do not annoyingly affect the viewing of the television images. On the other hand, by bending the lower portion of the pane in the direction of the lower edge of the screen there is a sufficient space below the upper portion of the pane in which the manually operable control elements of the television set can be disposed, as these elements do not protrude beyond the plane of the upper portion of the pane. Thus the desired reduction of the overall depth of the television set is fully obtained.

Accordingly to a further feature of the invention the protective pane can be of such known composition that it also serves as a filter for intensifying the contrast effect of the images on the screen of the television tube and for dampening such light reflections which may still be reflected on the television screen.

The invention is further described with reference to the accompanying drawings in which—

Figure 1:
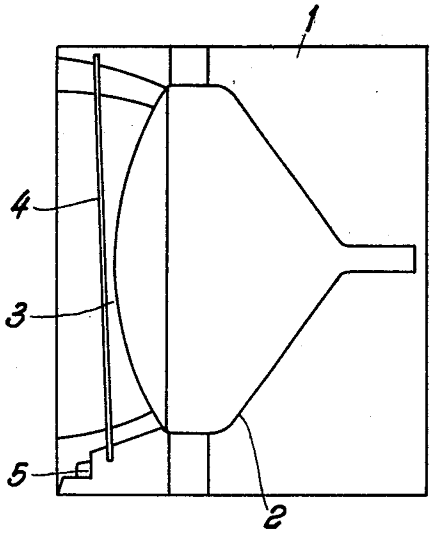
FIGURE 1 is a transverse sectional view of a television apparatus equipped with a protective pane of hitherto known type.

The television apparatus of FIGURE 1 shows a television set with an outer housing 1 surrounding the television tube 2 with image screen 3. In front of the screen 3 there is disposed at a small distance therefrom in a substantially vertical position a protective pane 4. FIGURE 1 shows that a comparatively large portion of the depth of the apparatus is required for providing a space for the operational control elements of the set.

Figure 2:
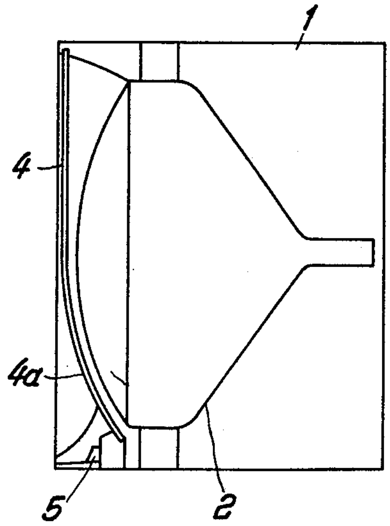
FIGURE 2 is a similar view as FIGURE 1 of a television apparatus with a protective pane according to the invention.

In the arrangement of FIGURE 2 the outer housing and the television tube are generally similar to those of FIGURE 1. The upper portion of the protective pane 4 is again of planar form and disposed substantially vertically. The lower portion *4a* of the pane is, however, bent back in the direction of the lower edge of the tube, which results in a considerable saving of overall depth. The operational control elements 5 can be arranged within the space thus gained as clearly shown in FIGURE 2.

The protective pane is made of safety glass and can either consist of laminated safety glass or a single pane of hardened safety glass. If laminated safety glass is used for the the protective pane the pane can serve both as protective sheet and as a filter for intensifying contrast of the television images viewed through the pane, the filter effect being obtained by adding in known manner colouring materials to the intermediate layer bonding the laminates.

I claim:

1. Television apparatus having a protective pane of safety glass disposed in front of the television tube screen at a small distance therefrom, characterized in that the upper portion of the protective pane is of planar configuration and arranged substantially vertically from a horizontal plane passing through the axis of said tube, the lower portion of the pane being curved inwardly in a direction towards the lower edge portion of the screen of the television tube and from a point extending downwardly from said horizontal plane.

2. Television apparatus according to claim 1, characterized in that the lower portion of the protective pane is of substantially cylindrical curvature with the radius of curvature substantially corresponding to the radius of curvature of the television screen from said horizontal plane to the lower edge of said screen.

3. Television apparatus having a protective pane of safety glass, disposed in front of the television tube screen at a small distance therefrom and in which said tube screen is curved on a predetermined radius of curvature, characterized in that the portion of the protective pane which is disposed above the horizontal axis plane of the television tube, is of planar configuration and arranged substantially vertically and normal to the axis of said television tube, the lower portion of the pane being curved inwardly in a direction towards the lower edge portion of the screen of the television tube from a point adjacent said horizontal axis plane.

4. Television apparatus according to claim 3, characterized in that the lower portion of the protective pane is of substantially cylindrical curvature with the radius of curvature substantially corresponding to the curvature which the radius of curvature television screen has at its intersection with a vertical center plane disposed normal to said screen.

5. Television apparatus having a protective pane of safety glass disposed in front of the television tube screen at a small distance therefrom and in which said tube screen has a radius of curvature, characterized in that the upper portion of the protective pane is of planar configuration and arranged substantially vertically and normal to a horizontal axis plane of the television tube, the lower portion of the pane being curved to extend inwardly in a direction towards the lower edge portion of the screen of the television tube, said lower curved portion of said screen being curved from a point adjacent said horizontal axis plane of said tube the protective pane being a sheet of laminated safety glass having an intermediate layer which comprises colouring materials for intensifying contrast of the television images viewed through said pane.

6. Television apparatus having a protective pane of safety glass disposed in front of the television tube screen at a small distance therefrom and in which said tube screen is curved on a predetermiend radius of curvature, characterized in that the upper portion of the protective pane is of planar configuration and arranged substantially vertically and normal to a horizontal axis plane of the television tube, the lower portion of the pane being curved to extend inwardly in a direction towards the lower edge portion of the screen of the television tube from a point adjacent said horizontal axis plane and having a substantially cylindrical configuration with the curvature substantially corresponding to the curvature of the television screen, the protective pane being a sheet of laminated safety glass having an intermediate layer which comprises colouring materials for intensifying contrast of the television images viewed through said pane.

7. In combination with a television set having a casing provided with a front opening and a television tube supported in said casing rearwardly of said opening, of a transparent panel extending across said opening in front of and spaced from said television tube, the upper portion of said transparent panel extending in a plane normal to a horizontal plane passing through the axis of said television tube and being substantially flat and the lower portion of said panel being curved downwardly and inwardly from said horizontal plane to extend within said opening and in spaced relation and conforming to the contour of the lower portion of said television tube, the space between the outer edge of the casing adjacent said opening providing space to accommodate various television control members.

References Cited in the file of this patent

UNITED STATES PATENTS

| | | |
|---|---|---|
| 2,734,142 | Barnes | Feb. 7, 1956 |
| 2,977,412 | Rhodes | Mar. 28, 1961 |

FOREIGN PATENTS

| | | |
|---|---|---|
| 708,365 | Great Britain | May 5, 1954 |